May 30, 1961  A. S. VOLPIN  2,986,156
AUTOMATIC LUBRICANT-SEALED PLUG VALVE
Filed Feb. 8, 1960  3 Sheets-Sheet 1

INVENTOR.
Alexander S. Volpin
BY
ATTORNEY

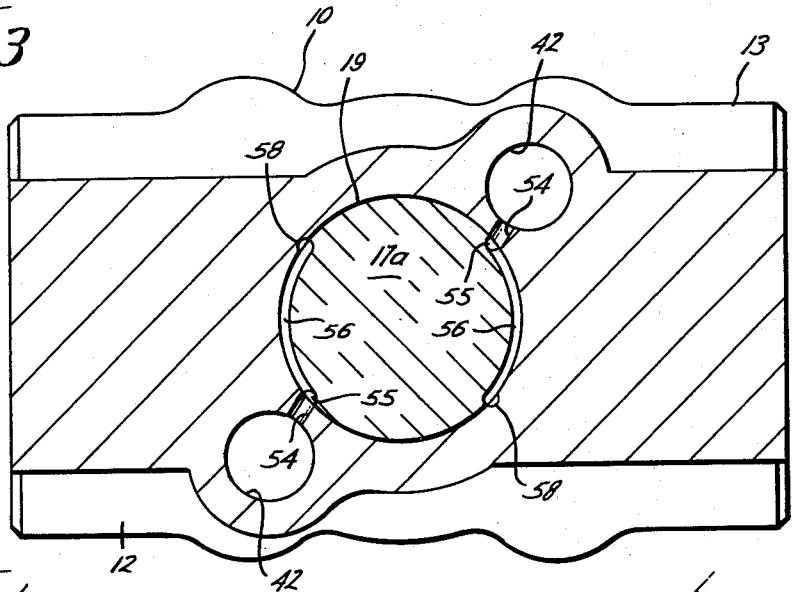
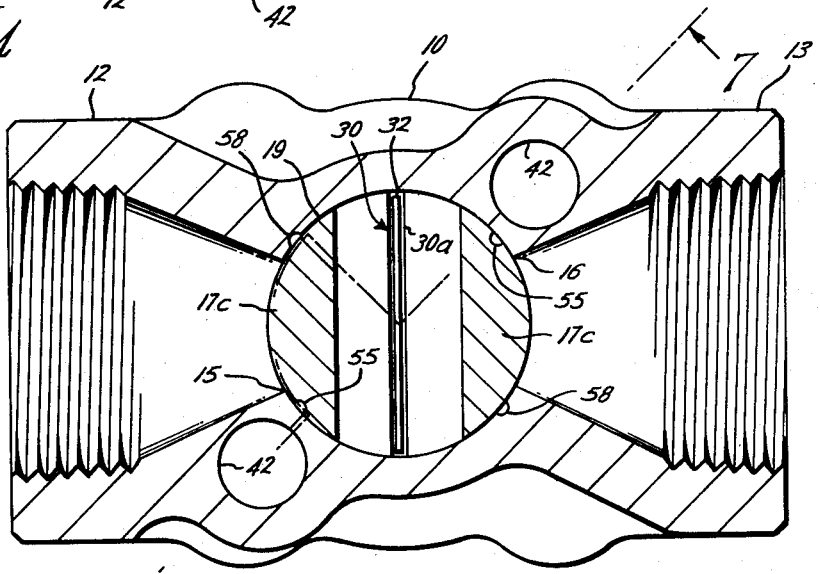
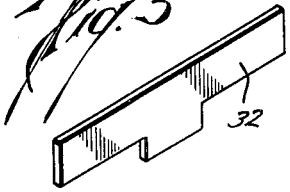
INVENTOR.
Alexander S. Volpin
BY
ATTORNEY

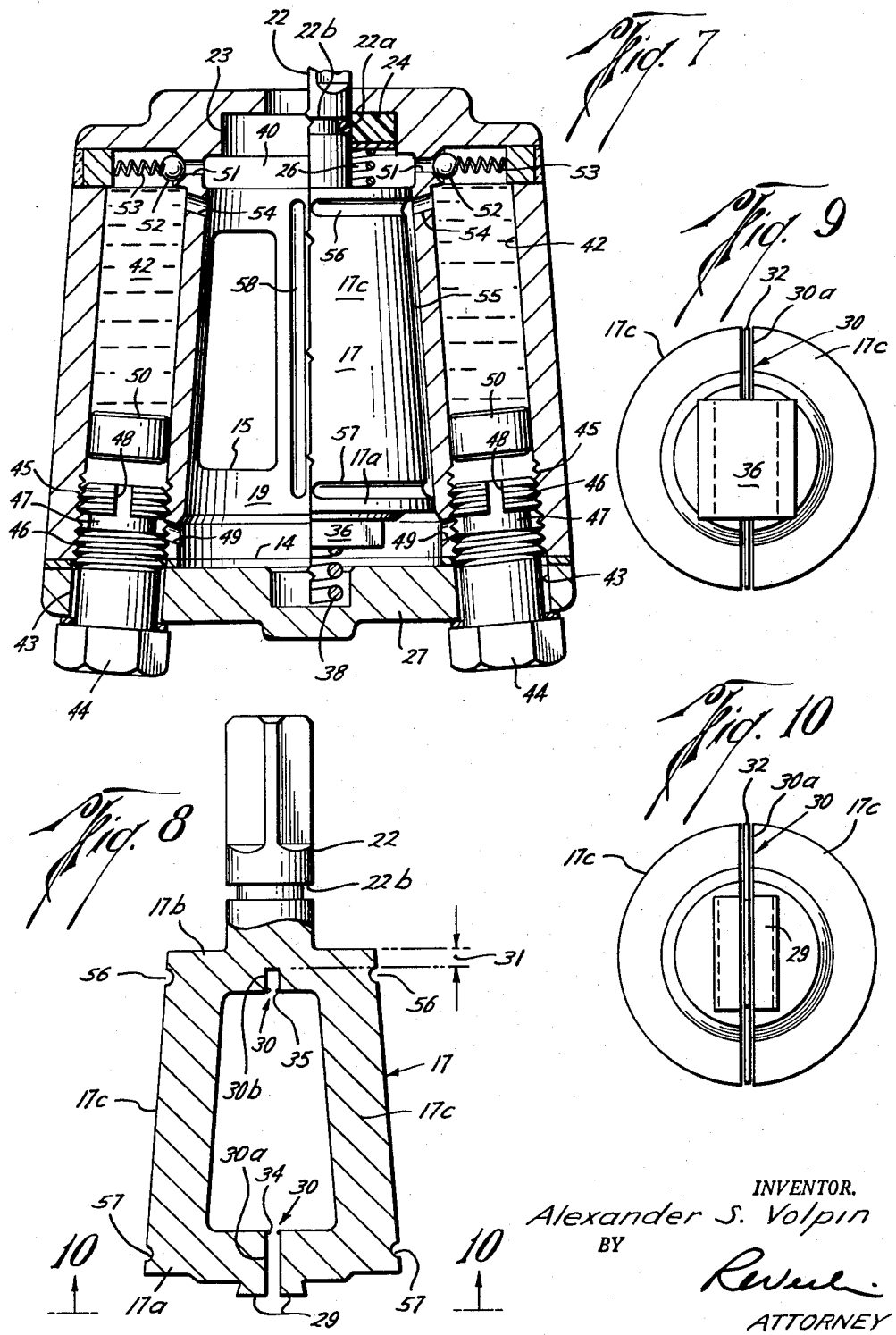

United States Patent Office 2,986,156
Patented May 30, 1961

1

2,986,156

AUTOMATIC LUBRICANT-SEALED PLUG VALVE

Alexander S. Volpin, 10200 W. Broadview Drive,
Miami Beach 54, Fla.

Filed Feb. 8, 1960, Ser. No. 7,463

11 Claims. (Cl. 137—246.12)

This invention relates to automatic lubricant-sealed plug valves, and more particularly to plug valves of the one-piece plug type.

Plug valves, particularly of the solid one-piece plug type, while possessing the advantage of comparatively simple construction, are subject to numerous defects and disadvantages by reason of their construction.

Due to the relative inflexibility of solid plugs, they are difficult to rotate or turn in numerous instances, as when they have not been operated for relatively long periods of time, and corrosion of the co-acting surfaces of the plug and seat occurs. When installed in lines through which hot fluids are flowing and the valve is shut-off, the drop in temperature in the housing will frequently cause contraction of the latter so as to freeze the plug; also, when the freedom of movement is reduced by conditions such as previously mentioned, the presence of grit or sediment in the fluids controlled by the valve may produce aggravated scoring of the plug and seat surface when the valve is operated, as well as galling of the metal engaging surfaces.

Segmented plugs for plug valves have long been used because they afford a desirable avoidance of hard operation due to their ability to flex inwardly. But such segmented plug designs introduce yet another operational problem of hard turning under unusual conditions. This is a condition known as "pressure locking" and develops when a segmented plug valve is in its closed position under pressure and the pressure on the upstream side is sharply reduced, thus causing both plug segments to simultaneously seal both upstream and downstream flow ports in response to a dominant pressure entrapped in the valve housing. This situation enormously increases torque requirement in operating the valve. Frequently a "cheater" (usually a length of pipe attached to the valve wrench) must be employed to increase leverage to overcome this difficult turning.

The instant invention is designed to retain the desirable flexibility of plug segmentation, yet through the unique employment of clamping means, my plug cannot expand beyond its nominal transverse measurement, thus eliminating troublesome pressure locks.

It is, therefore, a primary object of the present invention to provide an improved form of plug valve of the so-called "one-piece" plug type wich overcomes the various defects and disadvantages of more conventional plug valves such as described above, and which permits easy effective operation of the plug under all operating conditions.

In accordance with one embodiment of the present invention, the plug member, of frusto-conical shape, is constructed in a bifurcated form, the plug body being split longitudinally throughout the larger portion of its length, leaving an undivided portion at one end for centering and guiding the plug in its seat, but providing, by reason to the bifurcated or split construction, a limited degree of flexure or compressibility of the plug sections sufficient to obviate any freezing or sticking of the plug in its seat

2 under operating conditions which would otherwise produce such freezing and sticking. At the same time, means are provided on the plug which prevent spreading or separation of the plug sections beyond the dimension corresponding to the normal or nominal transverse dimension of the plug so as to maintain the normal taper of the plug in order that the plug will fit snugly in its seat, yet preventing "pressure locking." By providing such construction, the plug can be effectively sealed automatically by line pressure from the upstream side of the plug, the compressibility of the plug sections providing leakage space for the entrance of line pressure to the sealant supply reservoirs provided in the valve housing in order to feed sealing groove systems which are appropriately arranged between the plug sections and related housing portions to surround the flow ports in the valve housing.

A further object of this invention, therefore, is to provide a lubricant-sealed one-piece plug valve in which the plug is of a bifurcated form having limited compressibility of predetermined extent and having means preventing transverse enlargement beyond its nominal or normal dimension to thereby avoid difficult turning due to pressure locking.

Another important object is to provide a one-piece plug of frusto-conical shape which is bifurcated throughout the larger portion of its length to permit a limited degree of compressibility of the plug sections while preventing relative outward movement beyond the nominal taper and transverse dimension of the plug.

Other and more specific objects and advantages of this invention will become more readily apparent from the following detailed description when read in conjunction with the accompanying drawing which illustrates one useful embodiment in accordance with this invention.

In the drawing:

Fig. 1 is a longitudinal vertical sectional view of a plug valve in accordance with this invention;

Figs. 2, 3 and 4 are transverse cross-sectional views taken generally along the lines 2—2, 3—3 and 4—4, respectively, of Fig. 1;

Figs. 5 and 6 are perspective views of spacer elements employed in the plug body;

Fig. 7 is a vertical, partly sectional view taken along line 7—7 of Fig. 4, showing a portion of the plug body in elevation and a portion of the interior of the plug seat in the housing also in elevation;

Fig. 8 is a longitudinal cross-sectional view of the plug member;

Fig. 9 is a bottom view of the lower end of the plug member taken along line 9—9 of Fig. 1; and Fig. 10 is a similiar view of the lower end of the plug body taken along line 10—10 of Fig. 8.

Figure 1:
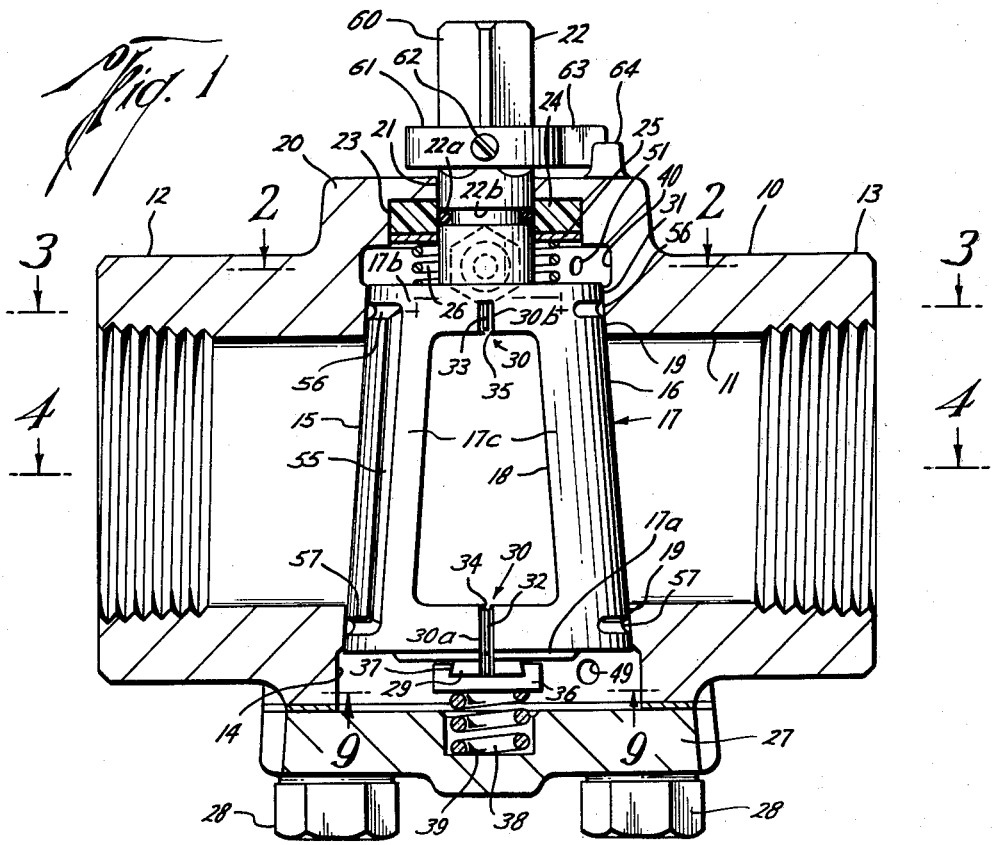
Figure 2:
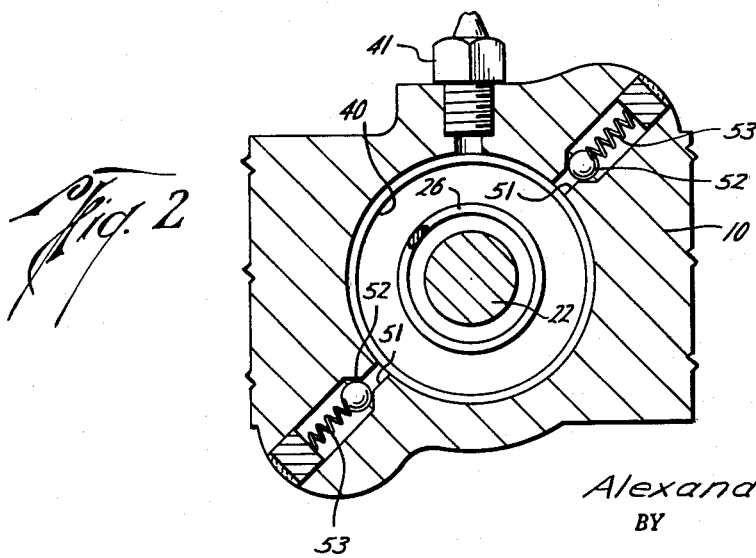

Referring to the drawing, the valve casing 10 is provided with a flowway 11 passing through end connections 12 and 13, either of which may be the inlet and the other the outlet. A plug chamber 14 intersects flowway 11 providing the opposite flow ports 15 and 16 and defining a tapered seat for a rotatable generally frusto-conical plug member 17 having a transverse flow port 18 therethrough adapted to register with ports 15 and 16 when the plug member is rotated to the open position.

In the illustrative embodiment, plug member 17 is shown as upwardly tapered, but as will be understood, it may be downwardly tapered in accordance with conventional designs. For the purposes of this description, the larger lower end portion of the plug member underlying flow port 18 is designated by the numeral 17a, while the smaller upper end portion, generally above flow port 18, is designated by the numeral 17b. The wall of chamber 14, which intersects the flow ports 15 and 16, defines a generally frusto-conical seat 19 adapted to snugly receive plug member 17.

Casing 10 is provided with an integrally formed upwardly extending hollow bonnet 20 having a bore 21 through which a stem 22 extends into plug chamber 14. Stem 22 may be integrally formed with the body of plug member 17, as illustrated, but it will be understood that the stem may be separable from the body of the plug member and connected thereto in any suitable and well-known manner by means of which the rotations of the stem may be imparted to the plug member for rotating the same in its seat.

The inner end portion of bore 21 is counter-bored to form the stuffing box 23 adapted to contain packing 24 for sealing between the stem and the wall of the bore. Gland ring 25 is disposed about the stem below packing 24 and a coil spring 26 is mounted about stem 22 in compression between bland ring 25 and upper end 17b of the plug member. An additional seal is provided between stem 22 and packing 24 by means of the O-ring gasket 22a which is mounted in an annular groove 22b in the stem periphery. The lower end of plug chamber 14 is closed by means of a cap plate 27 removably secured to housing 10 by means of the cap screws 28.

Lower end 17a of the plug member is provided centrally thereof with an integral dove-tail spline 29 which projects from the lower end face of the plug and extends transversely thereof substantially parallel to the longitudinal axis of port 18. The length of spline 29 is made substantially less than the diameter of lower end 17a and is generally centrally positioned thereon with respect to the periphery of the plug member.

Plug member 17 is bifurcated by means of a cut or split, designated generally by the numeral 30, which extends generally diametrically of the plug member and longitudinaly thereof, preferably along a plane which is co-incident with, or generally parallel to, the longitudinal axis of flow port 18 and, generally speaking, bisects the plug to form the sections 17c—17c. The split 30, which thus includes flow port 18, extends from the lower end face of dove-tail spline 29, which is likewise split symmetrically between the plug portions, to a point in upper end portion 17b which is spaced a short distance from the outer end face of end portion 17b, so as to leave a short section 31 of the upper end of the plug in solid or non-split form (see Fig. 8). The split 30 thus comprises the lower portion 30a which bisects lower plug portion 17a, port 18 and upper portion 30b which extends partly into upper plug portion 17b. Split 30 is of such width as will allow the lower or larger end portions of the plug sections to be compressed to a small extent; for example, two to three one-thousandths of an inch. Because of the practical difficulties of providing a split of such narrow dimensions by a reasonably economic operation, split 30 will normally be made considerably wider than the desired dimension, being usually formed by sawing or casting. In order to limit the contractive movements of the plug sections toward each other, to the small extent mentioned, lower and upper spacers 32 and 33, respectively, may be inserted in portions 30a and 30b, respectively, of split 30. These spacers will preferably have the shapes shown in Figs. 5 and 6, respectively, and will be retained against dislodgment from the split portions by means of suitable beads 34 and 35 formed along the edges of the split where the intersections with the lower and upper walls of port 18 occur. The thickness of the spacers 32 and 33 will be such that only a small amount of clearance between them and the walls of the splits will remain, the extent of the clearance being the afore-mentioned two to three one-thousandths of an inch. These spacers will also serve to protect the portions of the seat faces opposite the split from impingement thereon of fluid flowing through the plug port when the plug is in open position.

With this plug construction, it will be seen that the plug body will have a degree of flexure such that the lower end portion may be contracted or compressed two or three one-thousandths of an inch relative to its nominal or normal diameter. A clamp 36, having a dove-tail slot 37 extending longitudinally thereof, is slidably positioned over spline 29 to limit outward movement of the plug sections. The dove-tail slot 37, which receives spline 29, will be dimensioned to limit outward or radial movement of the plug sections to a position corresponding to the normal or nominal dimension of the lower end of the plug.

It will be seen, therefore, that by means of the bifurcated construction of the plug, together with the employment of spline 29 and clamp 36, the plug sections may contract to the limited extent mentioned, namely, two to three-thousandths of an inch, but when fully expanded, will have the nominal diameters and taper corresponding to those of the plug seat so that the plug body, as a whole, will fit in seat 19 in the normal manner. A coil spring 38 is seated in a well 39 formed in the center of the inner face of cap plate 27 and is disposed in compression between the bottom of well 39 and the lower face of clamp 36, whereby to resiliently urge plug member 17 upwardly into effective seating engagement in plug seat 19.

The valve is provided with an automatic lubricant-sealing system. The upper end of plug chamber 14 above upper end 17b of the plug forms a storage chamber 40 for lubricant or other conventional plastic-type sealant which may be introduced under pressure into chamber 40 through a pressure gun-type fitting 41 of conventional design.

A pair of generally vertically disposed, cylindrical lubricant reservoirs 42—42 are formed in the wall of housing 10 on opposite sides of the plug chamber and open to the lower end of the valve housing in registration with openings 43—43 formed in cap plate 27 (Fig. 7). Cap screws 44—44 extend from the exterior of the cap plate through openings 43—43 and screw into the lower ends of reservoir 42—42 which are provided with sections of internal threads 45 for receiving the cap screw threads 46. Cap screws 44 thus also serve, together with cap screws 28, to secure cap plate 27 to the valve housing. Each of the sections of threads 46 is interrupted at an intermediate point by a circumferential groove 47 which communicates with a groove portion 48 which extends longitudinally of the screw from groove 47 to the inner end of the cap screw. Groove 47 is positioned along each cap screw at a point such that when the cap screw 44 is fully inserted in the end of its related reservoir, it will be in communication with an opening 49 which extends through the wall of housing 10 and threads 45 to provide communication between reservoir 42 and the portion of plug chamber 14 below lower end 17a of the plug member. By means of these openings 49 communication is provided between the lower end of plug chamber 14 through circumferential cap screw grooves 47 and longitudinal cap screw grooves 48 with the interior of reservoirs 42, for purposes to be described more fully hereinafter. A barrier or piston 50 is slidable longitudinally in each of the reservoirs 42. The upper ends of reservoirs 42 communicate with sealant storage chamber 40 through passageways 51 through which sealant may be delivered into the reservoirs above the barriers 50. Passageways 51 are controlled by ball check valves 52 biased by means of springs 53 to positions closing passages 51 to return flow from reservoir 42 to chamber 40. Openings 54 are provided through the wall of plug seat 19 from the upper end portions of reservoirs 42 to provide sealant channels for delivery of sealant from the reservoirs to the surface of plug seat 19.

The plug member 17 and plug seat 19 are provided with sealing groove systems of appropriate form adapted to provide means for forming a continuous plastic seal about the flow ports 15 and 16. The latter are of generally trapezoidal shape, as best seen in Fig. 7, being generally the same shape as flow port 18, and the groove systems surrounding the flow ports will usually be of generally similar configuration adapted to be disposed concentrically about the flow ports when the plug member is in the flowway-closing position. Each of the groove systems has a portion thereof formed on the exterior of one of the plug sections 17c, this portion being of generally C-shaped configuration comprising the generally vertical groove segment 55 extending longitudinally along the surface of the plug section to points spaced a short distance from the upper and lower ends of the plug sections. The ends of groove segment 55 communicate with generally horizontally extending upper and lower groove segments 56 and 57, respectively. Groove segments 55, 56 and 57 thus form three sides of the trapezodial groove circuit, the fourth side of which is formed by a generally vertically extending groove segment 58 formed in the wall of plug seat 19, the groove segment 58 being so positioned that when the plug member 17 is rotated to the flowway-closing position, groove segment 58 will register with the ends of horizontal groove segments 56 and 57 to thereby complete the groove circuit. Passages 54 leading from the sealant reserviors are so positioned in the wall of the plug chamber that when the plug member is in the flowway-closing position, passages 54 will be in registration with the related groove systems, as best seen in Figs. 3 and 7. When plug member 17 has been rotated to the flowway-opening position, the groove segments on the plug sections will be rotated out of communication with vertical groove segments 58, thereby cutting off movement of sealant throughout the groove system.

The upper end of stem 22 is provided with a non-round portion 60 for reception of a turning wrench or wheel (not shown) and an orienting ring 61 is locked about end portion 60 by means of a set screw 62 and is provided with a radially projecting lug 63 which is adapted to engage an upstanding lug 64 mounted on bonnet 20 to limit turning of the plug member between flowway-opening and -closing positions.

In operation of the valve, with the plug member turned to the flowway-opening position, flow of sealant to the groove systems will be cut off, as previously mentioned, because the groove segments on the plug sections will be out of communication with groove segments 58 on the plug seat. When the plug member is rotated to the closed position, communication will be established through all four segments of the groove system, which will also be in communication through passages 54 with the respective sealant reservoirs 42. Line pressure from the upstream side of the valve, acting on the upstream section 17c of the plug member, will, by reason of the flexure permitted by split 30, unseat the upstream plug section sufficiently to allow line pressure to enter the plug chamber and flow through passages 49 and cap screw grooves 47 and 48 into the interior of the downstream reservoir 42 beneath barrier 50 and will urge the latter, by reason of the differential in pressure across the valve between the high and low sides thereof, upwardly in the reservoir, forcing sealant through passage 54 into the groove system surrounding the downstream flow port, thereby effectively sealing the latter against leakage.

Moreover, by reason of the bifurcated flexible construction of the plug member, the latter will always be readily rotatable between open and closed positions, the small clearance provided by the degree of flexing permitted being always available to obviate frictional resistance, grit which may be present, or any other type of rotation-resisting obstruction commonly occurring in plug valve operations.

By providing the solid or unsplit section 31 at the upper end of the plug member, a means is provided for registering the plug member with its seat to assure that the plug member will always be correctly positioned in its seat under the thrust of spring 38.

From the foregoing, it will be seen that the present invention provides a plug valve having all the attributes of simplicity of construction characteristic of such valves, but which is free from the difficulties commonly encountered with plug valves, and which also includes an automatic lubricant sealing system which additionally assists in not only sealing the valve against leakage, but also, in conjunction with the split construction of the plug, assures free turning and operation of the plug under all operating conditions.

It will be understood that various alterations and changes may be made in the details of the illustrative embodiment within the scope of the appended claims, but without departing from the spirit of this invention.

What I claim and desire to secure by Letters Patent is:

1. A plug valve, comprising, a valve housing having a flowway therethrough defining spaced flow ports, a plug having a nominal transverse dimension rotatably seated in the housing and cooperating with said flow ports for controlling said flowway, said plug having a transverse port therethrough adapted to register with the flow ports when the plug is rotated to the flowway-opening position, the body of said plug being bifurcated along a plane generally diametrically of the plug and extending generally longitudinally thereof from one end of the plug to a point spaced a short distance from the opposite end of the plug whereby to provide a pair of plug portions capable of flexure relative to each other, said portions being integrally secured to a non-flexible end portion, and means carried by said one end of the plug preventing relative outward movement of said portions beyond said nominal transverse dimension while permitting limited relative inward movement of said portions.

2. A plug valve, comprising, a valve housing having a flowway therethrough defining spaced flow ports, a frusto-conical plug having a nominal transverse dimension rotatably seated in the housing and cooperating with said flow ports for controlling said flowway, said plug having a transverse port therethrough adapted to register with the flow ports when the plug is rotated to the flowway-opening position, the body of said plug being bifurcated along a plane generally diametrically of the plug and extending generally longitudinally thereof from one end of the plug to a point spaced a short distance from the opposite end of the plug whereby to provide a pair of plug portions capable of flexure relative to each other, means carried by said one end of the plug preventing outward movement of the plug portions relative to one another beyond said nominal transverse dimension while permitting limited relative inward movement of the plug portions, and means for distributing sealing material between said plug portions and said housing about said flow ports.

3. A plug valve, comprising, a valve housing having a flowway therethrough defining spaced flow ports, a frusto-conical plug having a nominal transverse dimension rotatably seated in the housing and cooperating with said flow ports for controlling said flowway, said plug having a transverse port therethrough adapted to register with the flow ports when the plug is rotated to the flowway-opening position, the body of said plug being bifurcated along a plane generally diametrically of the plug and extending generally longitudinally thereof from one end of the plug to a point spaced a short distance from the opposite end of the plug whereby to provide a pair of plug portions capable of flexure relative to each other, means carried by said one end of the plug preventing outward movement of the plug portions relative to one another beyond said nominal transverse dimension while permitting limited relative inward movement of the plug portions, and means responsive to line pressure on the valve for distributing sealing material between said plug portions and said housing about said flow ports.

4. A plug valve, comprising a valve housing having a flowway therethrough defining spaced flow ports, a frusto-conical plug having a nominal transverse dimension rotatably seated in the housing and cooperating with said flow ports for controlling said flowway, said plug having a transverse port therethrough adapted to register with the flow ports when the plug is rotated to the flowway-opening position, the body of said plug being bifurcated along a plane generally diametrically of the plug and extending generally longitudinally from one end of the plug to a point spaced a short distance from the opposite end of the plug whereby to provide a pair of plug portions capable of flexure relative to each other, means carried by said one end of the plug preventing outward movement of the plug portions relative to one another beyond said nominal transverse dimension while permitting limited relative inward movement of the plug portions, and means responsive to line pressure on the valve for distributing sealing material between said plug portions and said housing about said flow ports, said last-mentioned means including sealant material reservoirs carried by the valve housing exposed to said line pressure, and means to inject sealant material into said reservoirs.

5. A plug valve as defined by claim 4 including a movable barrier in each of said reservoirs.

6. A plug valve, comprising a valve housing having a flowway therethrough defining spaced flow ports, a frusto-conical plug having a nominal transverse dimension rotatably seated in the housing and cooperating with said flow ports for controlling said flowway, said plug having a transverse port therethrough adapted to register with the flow ports when the plug is rotated to the flowway-opening position, the body of said plug being bifurcated along a plane generally diametrically of the plug and extending generally longitudinally from one end of the plug to a point spaced a short distance from the opposite end of the plug whereby to provide a pair of plug portions capable of flexure relative to each other, means carried by said one end of the plug preventing outward movement of the plug portions relative to one another beyond said nominal transverse dimension while permitting limited relative inward movement of the plug portions, and means responsive to line pressure on the valve for distributing sealing material between said plug portions and said housing about said flow ports, said last-mentioned means including sealant material reservoirs carried by the valve housing exposed to said line pressure, a movable barrier in each of said reservoirs, means to inject sealant material under pressure into said reservoirs, a sealant material conduit disposed in the wall of the housing to direct sealant material to the smaller end of said plug from the injection means, additional conduits in the wall of the housing to conduct sealant material to said reservoirs, resilient means normally urging said plug member to a seated position, said plug member being unseatable in response to injection pressure of the sealant material on said smaller end when said injection pressure is greater than the pressure of forces bearing against the larger end of said plug.

7. A plug for plug valves, comprising, a frusto-conical body having a nominal transverse dimension and having a transverse port therethrough, said body being bifurcated along a plane generally diametrically thereof, the bifurcation extending generally longitudinally from one end of the body to a point spaced a short distance from the opposite end thereof, to thereby provide plug portions capable of flexure relative to each other integrally secured to a non-flexible end portion, and means carried by said one end of the body engaged with the flexible plug portions to prevent relative outward movement thereof beyond said nominal transverse dimension while permitting relative inward movement thereof.

8. A plug for plug valves, comprising, a frusto-conical body having a nominal transverse dimension and a transverse port therethorugh, stem means secured to one end of the body for rotating the same, said body being bifurcated along a plane generally diametrically thereof, the bifurcation extending generally longitudinally from one end of the body to a point spaced a short distance from the opposite end thereof, to thereby provide plug portions capable of flexure relative to each other integraly secured to a non-flexible end portion, and means carried by said one end of the body engaged with the flexible plug portions to prevent relative outward movement thereof beyond said nominal transverse dimension while permitting relative inward movement thereof.

9. A plug for plug valves, comprising, a frusto-conical body having a nominal transverse dimension and having a transverse port therethrough, said body being bifurcated along a plane generally diametrically thereof, the bifurcation extending generally longitudinally from one end of the body to a point intermediate said port and the opposite end of the body, to thereby provide plug portions capable of flexure relative to each other integrally secured to a non-flexible end portion, and means carried by said one end of the body and engaged with the flexible plug portions to prevent relative outward movement thereof beyond said nominal transverse dimension while permitting relative inward movement thereof.

10. A closure for a valve, comprising, a closure body having a nominal transverse dimension and having a transverse port therethrough, said body being bifurcated along a plane generally diametrically thereof, the bifurcation extending generally longitudinally from one end of the body to a point spaced a short distance from the opposite end thereof, to thereby provide spaced body portions capable of flexure relative to each other integrally secured to a non-flexible end portion, and means carried by said one end of the body and engaged with the flexible body portions to prevent relative outward movement thereof beyond said nominal transverse dimension while permitting relative inward movement thereof.

11. A plug for a plug valve, said plug comprising a body, a stem integral therewith, a transverse flow port through the body, sealing surfaces about the periphery of the body preformed to a nominal transverse dimension, an arrangement to maintain said nominal dimension against transverse enlargement while permitting limited reduction in said transverse dimension, comprising, a bifurcation extending generally diametrically of said body and generally longitudinally thereof from one end of the body so as to provide a pair of separate flexible portions integrally connected with said stem, and means carried by said one end of the body and engaged with said flexible portions to prevent relative outward movement of said flexible portions beyond said nominal transverse dimension while permitting limited relative inward movement thereof.

No references cited.